United States Patent
Smith et al.

(10) Patent No.: US 10,551,098 B2
(45) Date of Patent: Feb. 4, 2020

(54) LUBRICANT TEMPERATURE CONTROL WITH A FLOW REGULATING DEVICE

(71) Applicant: TRANE INTERNATIONAL INC., Piscataway, NJ (US)

(72) Inventors: Todd W. Smith, Onalaska, WI (US); Todd Kearney, Onalaska, WI (US); Greg Chilcote, Onalaska, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 304 days.

(21) Appl. No.: 14/929,652

(22) Filed: Nov. 2, 2015

(65) Prior Publication Data
US 2016/0123634 A1    May 5, 2016

Related U.S. Application Data

(60) Provisional application No. 62/073,614, filed on Oct. 31, 2014.

(51) Int. Cl.
*F25B 31/00* (2006.01)
*F16H 57/04* (2010.01)
*F01P 7/16* (2006.01)

(52) U.S. Cl.
CPC .............. *F25B 31/004* (2013.01); *F01P 7/16* (2013.01); *F16H 57/0413* (2013.01); *F01P 2060/04* (2013.01); *Y10T 137/7737* (2015.04)

(58) Field of Classification Search
CPC ................ F16H 57/0413; F25B 31/004; F24F 2011/0045; F24F 2011/0061; F01P 2060/045; F01P 2060/04; F01P 7/16; Y10T 137/7737

See application file for complete search history.

(56) References Cited

U.S. PATENT DOCUMENTS

| | | | |
|---|---|---|---|
| 3,379,033 A | 4/1968 | Grant | |
| 3,407,623 A | 10/1968 | Richardson et al. | |
| 3,721,108 A | 3/1973 | Kocher | |
| 3,913,661 A | 10/1975 | Burg et al. | |
| 4,254,637 A | 3/1981 | Brauch et al. | |
| 4,275,570 A | 6/1981 | Szymaszek et al. | |
| 5,613,368 A | 3/1997 | Marohl et al. | |
| 8,122,735 B2 | 2/2012 | Sakitani et al. | |

(Continued)

FOREIGN PATENT DOCUMENTS

| | | |
|---|---|---|
| CN | 101813016 A | 8/2010 |
| CN | 201795261 U | 4/2011 |

(Continued)

OTHER PUBLICATIONS

JPS54161105 A translation.*

(Continued)

*Primary Examiner* — Jon T. Schermerhorn, Jr.
(74) *Attorney, Agent, or Firm* — Hamre, Schumann, Mueller & Larson, P.C.

(57) ABSTRACT

Apparatuses, systems, and methods to regulate the temperature of lubricant are provided. The regulation of the lubricant temperature can include increasing or decreasing the temperature of the lubricant. More specifically, apparatuses and methods are disclosed to reduce the temperature of the lubricant before it is directed to a mechanical component for lubrication purposes.

7 Claims, 3 Drawing Sheets

(56) References Cited

U.S. PATENT DOCUMENTS

| | | | |
|---|---|---|---|
| 2004/0187505 A1 | 9/2004 | Hoff et al. | |
| 2010/0319638 A1* | 12/2010 | Hollweck | F01M 5/002 123/41.42 |
| 2011/0107790 A1 | 5/2011 | Dunn et al. | |
| 2012/0090340 A1 | 4/2012 | Okamoto et al. | |
| 2016/0003510 A1* | 1/2016 | De Larminat | F25B 31/004 62/470 |

FOREIGN PATENT DOCUMENTS

| | | | |
|---|---|---|---|
| CN | 102240923 A | | 11/2011 |
| CN | 102425605 A | | 4/2012 |
| CN | 202250720 U | | 5/2012 |
| CN | 203036230 U | | 7/2013 |
| CN | 203516693 U | | 4/2014 |
| CN | 104100828 A | | 10/2014 |
| JP | S54161105 A | * | 12/1979 |
| JP | 58-148213 A | | 9/1983 |

OTHER PUBLICATIONS

JPS54161105 A abstract.*
Office Action, Chinese Patent Application No. 201510733517.6, dated Jul. 9, 2018 with partial English translation (13 pages).

* cited by examiner

LUBRICANT TEMPERATURE CONTROL WITH A FLOW REGULATING DEVICE

FIELD

This disclosure relates generally to apparatuses, systems, and methods to regulate temperature of a lubricant, such as oil. Regulation of the temperature of the lubricant may include a decrease or an increase of the temperature of the lubricant. More specifically, this disclosure relates to apparatuses, systems, and methods to regulate temperature of the lubricant before it is directed to mechanical components for lubrication purposes.

BACKGROUND

Lubricant, such as oil, is commonly used for lubricating moving mechanical components, e.g., compressor bearings. Lubricant has different viscosities at different temperatures. Different viscosities produce different lubricating effects. For example, the spinning of a centrifugal compressor often heats up the lubricant. Overheated lubricant has a relatively lower viscosity which may have a relatively reduced lubricating effect. On the other hand, when the lubricant is too cold due to, e.g., cold ambient temperature, the viscosity of the lubricant may be too high. Lubricant with too high of a viscosity may also have a reduced lubricating effect.

SUMMARY

A lubricant temperature regulator can be used to regulate a temperature of a lubricant. Lubricant, such as, but not limited to, oil, is often used to lubricate moving mechanical components, e.g., hydrodynamic bearings of a centrifugal compressor. This disclosure relates to controlling the temperature of the lubricant, so that the viscosity of the lubricant can produce satisfactory lubricating effects. Apparatuses, systems, and methods may use the lubricant temperature regulator as a part of a heating, ventilating, air conditioning (HVAC) unit. For example, a lubricant temperature regulator can be used within a chiller unit of a refrigeration and/or HVAC system to control a temperature of a lubricant, such that the lubricant provides a satisfactory lubricating effect, for example, to the compressor bearings of a chiller.

In general, the temperature of a lubricant is determined. Determination of the lubricant temperature can be done with a temperature sensor. When the temperature of the lubricant is too high, the lubricant can be cooled. When the temperature of the lubricant is too low, the lubricant can be heated. In an embodiment, when the lubricant needs to be cooled, a relatively colder refrigerant can be used to perform a heat exchange with the lubricant. When the lubricant needs to be heated, a source of heat, e.g., a heater, etc., can be used to heat the lubricant. The temperature signal determined by the temperature sensor may be used to control an amount of heating or cooling used to heat or cool the lubricant.

In an embodiment, the control of the flow of refrigerant is on/off. In an embodiment, the control of the flow of refrigerant is increasing or decreasing.

In an embodiment, the control of the heating output of a source of heat is on/off. In an embodiment, the control of the heating output of a source of heat is increasing or decreasing.

In an embodiment, a lubricant temperature regulator includes a heat exchanger. The heat exchanger includes a lubricant input. The lubricant input is configured such that lubricant flows into the heat exchanger. The heat exchanger includes a lubricant output. The lubricant output is configured such that lubricant flows out from the heat exchanger. The heat exchanger includes a refrigerant input. The refrigerant input is configured such that refrigerant flows into the heat exchanger. The heat exchanger includes a refrigerant output. The refrigerant output is configured such that refrigerant flows out from the heat exchanger.

The lubricant temperature regulator can further include a flow control device disposed upstream of the refrigerant input. The flow control device can regulate a flow of refrigerant into the heat exchanger. In an embodiment, the flow control device can be a valve. In an embodiment, the flow control device can be a solenoid valve. In an embodiment, the control of the flow of a refrigerant through the flow control device is on/off. In an embodiment, the control of the flow of a refrigerant through the flow control device is increasing or decreasing.

A temperature sensor can be operatively connected to the flow control device. The temperature sensor can be configured such that the signal sensed or determined can be used in controlling the flow control device to regulate the flow of the refrigerant. The temperature sensor can be disposed at a location to sense a temperature of lubricant. This location can be referred to as a lubricant sensing location. The lubricant sensing location may be near the moving mechanical components which require lubrication. In an embodiment, the lubricant sensing location can be within the compressor. In an embodiment, the lubricant sensing location can be where the sensor can sense the lubricant that flows into the heat exchanger. It will be appreciated that the lubricant sensing location can be at any suitable location where a lubricant temperature can be determined and where such determination may be desired and/or necessary.

A refrigerant source can be any location in an HVAC system from which cold refrigerant can be drawn. The term cold refrigerant refers to refrigerant that has a sufficient capacity to cool down lubricant by performing a heat exchange. Depending on different system designs, the refrigerant can be drawn from different parts in an HVAC system. In an embodiment, the refrigerant source can be a condenser. In an embodiment, the refrigerant source can be a part of an HVAC system where liquid refrigerant is further subcooled, e.g., a subcooler of a condenser. In an embodiment, the refrigerant source can be an economizer or a reservoir. In an embodiment, the refrigerant source can be an evaporator.

In an embodiment, a lubricant temperature regulator can have a cooling function. In such an embodiment, when the determined temperature of the lubricant is higher than a first temperature, a flow control device disposed upstream of the heat exchanger can be opened or turned on to provide a flow of refrigerant flowing into the heat exchanger to cool the lubricant. When the determined temperature of the lubricant is lower than a second temperature, the flow control device disposed upstream of the heat exchanger can be turned off or decreased to disable or decrease the flow of the refrigerant flowing into the heat exchanger.

In an embodiment, a lubricant temperature regulator has both cooling and heating functions. In such an embodiment, when the determined temperature of the lubricant is higher than a first temperature, a flow control device disposed upstream of the heat exchanger can be opened or turned on to provide a flow of refrigerant into the heat exchanger to cool the lubricant. When the determined temperature of the lubricant is lower than a second temperature, the flow control device disposed upstream of the heat exchanger can be turned off or decreased to disable or decrease the flow of the refrigerant flowing into the heat exchanger.

When the temperature of the lubricant is above a third temperature, an amount of heat provided by a source of heat that heats up the lubricant or refrigerant can be disabled or decreased. When the determined temperature of the lubricant is below a fourth temperature, an amount of heat provided by a heat source that heats the lubricant or refrigerant can be enabled or increased to heat the lubricant or refrigerant.

In an embodiment, a method for regulating lubricant temperature includes determining a temperature of a lubricant. In an embodiment, when the determined temperature of the lubricant is higher than a first temperature, opening a flow control device disposed upstream of the heat exchanger to enable or increase the flow of the refrigerant into the heat exchanger, directing the lubricant into a heat exchanger; and providing a flow of refrigerant into the heat exchanger. In an embodiment, when the determined temperature of the lubricant is lower than a second temperature, closing the flow control device disposed upstream of the heat exchanger to decrease the flow of the refrigerant into the heat exchanger.

In an embodiment, the method for controlling lubricant temperature includes directing a lubricant into a heat exchanger from a lubricant source and directing a refrigerant into the heat exchanger from a refrigerant source. The refrigerant source can provide the refrigerant being drawn into the heat exchanger.

In an embodiment, the method further includes determining whether the determined temperature is higher than a third temperature; when the determined temperature is higher than the third temperature, a heating output provided by a source of heat for heating the lubricant can be reduced or disabled. In an embodiment, the method further includes determining whether the lubricant temperature is lower than a fourth temperature; when the determined temperature is lower than the fourth temperature, a heating output provided by a source of heat for heating up the lubricant can be increased or enabled.

It should be understood that in an HVAC system, such as in a chiller unit, the lubricant and refrigerant are often presented as a mixture. In this disclosure, the term lubricant is to be understood as lubricant alone or a mixture that is predominantly lubricant. The term refrigerant is to be understood as refrigerant alone or a mixture that is predominantly refrigerant.

A method for regulating lubricant temperature can include determining a temperature of a lubricant. In an embodiment, when the determined temperature of the lubricant is higher than a first temperature, opening a flow control device disposed upstream of a heat exchanger enable or increase the flow of the refrigerant into the heat exchanger, directing the lubricant into a heat exchanger; and providing a flow of refrigerant into the heat exchanger. In an embodiment, when the determined temperature of the lubricant is lower than a second temperature, closing the flow control device disposed upstream of the heat exchanger to decrease the flow of the refrigerant into the heat exchanger. In an embodiment, the flow of the refrigerant is adjustable according to the determined temperature of the lubricant. In an embodiment, the method further includes determining whether the lubricant temperature is higher than a third temperature; when the determined temperature is higher than the third temperature, a heating output provided by a source of heat for heating up the lubricant is reduced or disabled. In an embodiment, the method further includes determining whether the lubricant temperature is lower than a fourth temperature; when the determined temperature is lower than the fourth temperature, a heating output provided by a source of heat for heating up the lubricant is increased or enabled.

BRIEF DESCRIPTION OF DRAWINGS

References are made to the accompanying drawings that form a part of this disclosure, and which illustrate embodiments in which the systems and methods described in this specification can be practiced.

Like reference numbers represent like parts throughout.

DETAILED DESCRIPTION

Lubricant, such as, but not limited to, oil, is commonly used to lubricate moving mechanical components, such as, but not limited to, compressor bearings. Lubricant generally has different viscosities at different temperatures. Different viscosities can produce different lubricating effects. To optimize a lubricating effect of the lubricant, it may be desired that the temperature of the lubricant be maintained within a certain range. A compressor in operation often heats up the lubricant, which may result in overheated lubricant. Overheated lubricant may have a lower viscosity which may have a reduced lubricating effect. In an example of a chiller unit using a centrifugal compressor with hydrodynamic bearings, it may be desired to maintain the temperature of the lubricant within a certain temperature range to ensure suitable viscosity and desired lubricating effects. Therefore, apparatuses, systems, and methods to regulate the lubricant temperature can provide an operative lubricating effect for compressor bearings or for any other moving mechanical components.

Figure 1:
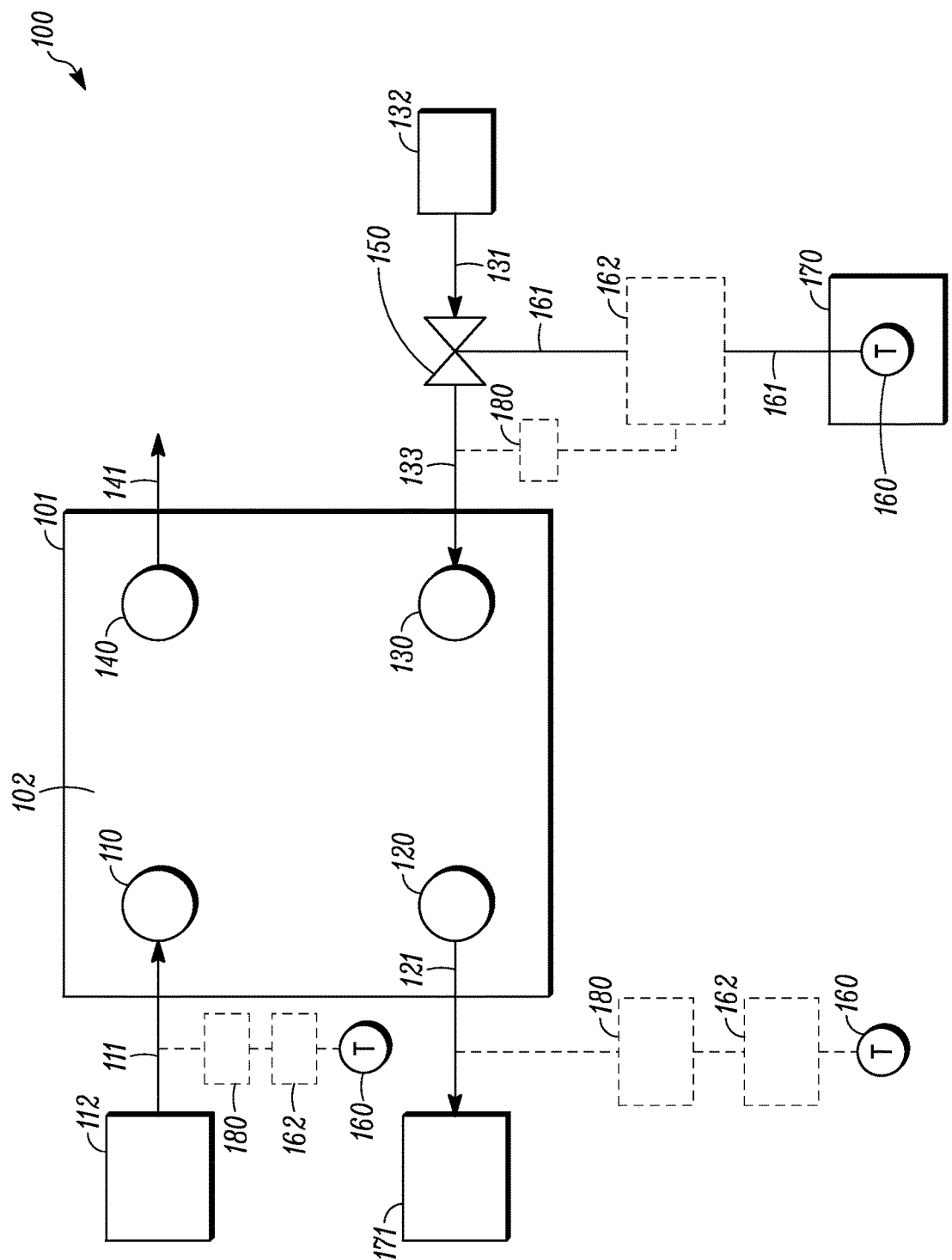
FIG. 1 shows a lubricant temperature regulating system, according to an embodiment.

FIG. 1 shows a lubricant temperature regulating system 100, according to an embodiment. As illustrated, the lubricant temperature regulating system 100 includes a lubricant temperature regulator 101. The lubricant temperature regulator 101 includes a heat exchanger 102. The heat exchanger 102 includes a lubricant input 110, a lubricant output 120, a refrigerant input 130, and a refrigerant output 140. The lubricant input 110 is configured such that lubricant flows into the heat exchanger 102. The lubricant output 120 is configured such that lubricant flows out from the heat exchanger 102. The refrigerant input 130 is configured such that refrigerant flows into the heat exchanger 102. The refrigerant output 140 is configured such that refrigerant flows out from the heat exchanger 102 at 141.

In an embodiment, the heat exchanger 102 can reduce a temperature of the lubricant via a heat exchange relationship between a relatively hotter lubricant and a relatively colder refrigerant. In an embodiment, the lubricant can have a relatively higher temperature when flowing into the heat exchanger 102 and a relatively lower temperature when flowing from the heat exchanger 102. In an embodiment, the refrigerant can have a relatively lower temperature when flowing into the heat exchanger 102 and a relatively higher temperature when flowing from the heat exchanger 102. In an embodiment, a lubricant temperature regulator 101 can include a flow control device 150 disposed upstream (e.g., prior to the refrigerant reaching the refrigerant input 130) of the refrigerant input 130. The flow control device 150 can regulate a flow of refrigerant flowing into the heat exchanger 102.

In an embodiment, a lubricant temperature regulator 101 includes a temperature sensor 160 operatively connected to the flow control device 150. The temperature sensor 160 is configured such that the signal of the temperature sensor 160 is used in controlling the flow control device 150. In an embodiment, signal is to be understood as an electrical or electromagnetic signal, such as electric voltage, electric current, radiation, or the like.

In an embodiment, the temperature sensor 160 can send a signal to an optional control unit 162 through a signal line 161. The term signal line 161 generally refers to an electrical/electromagnetic/electronic communication between the connected components, e.g., temperature sensor 160 and flow control device 150, temperature sensor 160 and control unit 162, and/or control unit 162 and flow control device 150. It is to be understood that the signal line 161 is not required to have a physical line or connection, for example, a wireless communication is sufficient to complete the communication. The control unit 162 may control the opening and closing of the flow control device 150 according to the signal sent by the temperature sensor 160. The control unit 162 can send a control signal to the flow control device 150 through a signal line 161. The signal line 161 establishes an electrical/electronic communication between the control unit 162 and the flow control device 150.

In an embodiment, the control unit 162 may amplify the voltage and/or current signal of the temperature sensor 160. In an embodiment, the control unit 162 may also perform logical determinations based on the temperature of the lubricant determined. For example, when the determined temperature is higher than a first temperature, the flow control device 150 can be controlled by the control unit 162 to increase the flow of the refrigerant. When the determined temperature is lower than a second temperature, the flow control device 150 can be controlled by the control unit 162 to decrease the flow of the refrigerant. In another example, when the determined temperature is higher than a first temperature, the flow control device 150 can be controlled by the control unit 162 to enable the flow of the refrigerant. In another example, when the determined temperature is lower than a second temperature, the flow control device 150 can be controlled by the control unit 162 to disable the flow of the refrigerant.

In an embodiment, the control unit 162 may be disposed operatively downstream of the temperature sensor 160 and operatively upstream of the flow control device 150. The control unit 162 being disposed operatively downstream of the sensor 160 means the control unit 162 takes the temperature signal of the sensor 160 as an input signal for further signal processing. That is, the sensor 160 can be operatively upstream of the control unit 162. The control unit 162 being disposed operatively upstream of the flow control device 150 means the control unit 162 can send out a signal to control the flow control device 150. That is, the flow control device 150 can be operatively downstream of the control unit 162.

The control unit 162 can include a processor, a memory, a clock, and an input/output (I/O) interface (not shown). In an embodiment, the control unit 162 can include fewer or additional components. The control unit 162 can be configured to open and close the flow control device 150.

In an embodiment, the control unit 162 can be configured to increase or decrease an opening of the flow control device 150 to increase or decrease an amount of flow through the flow control device 150. The control unit 162 can be configured to turn-on or turn-off a heating output of a source of heat 180 that heats up the lubricant. The control unit 162 can be configured to increase or decrease the heating output of the source of heat 180.

The temperature sensor 160 is disposed at a lubricant sensing location 170 to sense the temperature of lubricant that flows into the heat exchanger 102 through the lubricant input 110. Lubricant sensing location 170 is defined as a location where the temperature sensor 160 is disposed to sense a temperature of the lubricant. When the temperature is higher than a first temperature, the flow control device 150 is configured to turn on or increase the flow of the refrigerant. When the temperature is lower than a second temperature, the flow control device 150 is configured to turn off or decrease the flow of the refrigerant.

The temperature sensor 160 is disposed at a location to sense a temperature of lubricant. This location is defined as a lubricant sensing location 170. The lubricant sensing location 170 may be near the moving mechanical components which require lubrication. In an embodiment, the lubricant sensing location 170 can be within the compressor. In an embodiment, the lubricant sensing location 170 can be at a location where the sensor can sense a temperature of the lubricant flowing into the heat exchanger 102. It will be appreciated that the lubricant sensing location 170 can be at any suitable location where a lubricant temperature can be determined and where such determination may be desired and/or necessary. That is, the lubricant sensing location 170 can be selected such that the temperature of the lubricant is sensed prior to being provided to one or more mechanical components. For example, in an embodiment, the location can be selected such that the temperature sensor 160 is disposed between a sump of a compressor and the one or more mechanical components to be lubricated.

In an embodiment, such as the embodiment shown in FIG. 1, a lubricant regulating system 100 includes a lubricant source 112. The lubricant source 112 is disposed upstream of the lubricant input 110. A lubricant input line 111 fluidly connects the lubricant source 112, directing the lubricant from the lubricant source 112 to the lubricant input 110. A lubricant output line 121 is disposed downstream of the lubricant output 120. The lubricant output line 121 can direct the lubricant to any moving mechanical components 171 that need to be lubricated. In an embodiment, the lubricant in the lubricant output line 121 can be directed to bearings of a compressor for lubrication purposes, such as hydrodynamic bearings in a centrifugal compressor of a chiller of an HVAC system.

A refrigerant source 132 can be disposed at a location in an HVAC system from which relatively cold refrigerant can be drawn. The term cold refrigerant refers generally to refrigerant that has a sufficient capacity to cool down lubricant by performing a heat exchange. Depending on different system designs, the refrigerant can be drawn from different parts in the HVAC system. In an embodiment, the refrigerant source 132 can be a condenser. In an embodiment, the refrigerant source 132 can be a part of an HVAC system where liquid refrigerant can be further subcooled, e.g., a subcooler of a condenser. In an embodiment, the refrigerant source 132 can be an economizer or a reservoir. In an embodiment, the refrigerant source 132 can be an evaporator. In an embodiment, the refrigerant source 132 can be a pipe or any mechanical component that is connected in the fluid circuit in an HVAC system.

A refrigerant source 132 is disposed upstream of a flow control device 150. In an embodiment, the refrigerant source can be, for example, a condenser, an economizer, or an evaporator. In an embodiment, the refrigerant source can be a sub-cooled area of a condenser. A first refrigerant input line 131 is disposed upstream of the flow control device 150 and downstream of the refrigerant source 132. The first refrigerant input line 131 fluidly connects the refrigerant source 132 and the flow control device 150. A second refrigerant input line 133 disposed upstream of refrigerant input 130 and downstream of the flow control device 150. The second refrigerant input line 133 fluidly connects the flow control device 150 and the refrigerant input 130.

The lubricant temperature regulating system 100 can have cooling and/or heating functionality. That is, in an embodiment, the lubricant temperature regulating system 100 can include a cooling mode and a heating mode.

When operating in the cooling mode, when the temperature of the lubricant determined by the temperature sensor 160 is higher than a first temperature, the flow control device 150 can be configured to provide a flow of refrigerant to the heat exchanger to cool down the lubricant. In an embodiment, when the temperature of the lubricant determined is lower than a first temperature, the flow control device 150 can be configured to stop or decrease a flow of refrigerant.

When operating in the heating mode, when the temperature of the lubricant is above a third temperature, an amount of heat provided by a source of heat 180 that heats up the lubricant can be shut-off or decreased. In an embodiment, when the temperature of the lubricant is below a fourth temperature, an amount of heat provided by a source of heat 180 that heats up the refrigerant can be turned on or increased to heat up the lubricant. In an embodiment, the source of heat 180 can be provided upstream of the lubricant input 110 of the heat exchanger 102. In an embodiment, the source of heat 180 can be provided downstream of the lubricant output 120 of the heat exchanger 102. In an embodiment, the source of heat 180 can be incorporated in the lubricant source 112. The source of heat 180 is optional in the temperature regulating system 100.

In an embodiment, a source of heat 180 can be installed upstream of the refrigerant input 130 to heat the refrigerant. In such an embodiment, the refrigerant source 132 can be a location that provides refrigerant with a sufficiently high temperature. In an embodiment, the refrigerant itself can have a sufficiently high temperature to heat the lubricant. In an embodiment, the refrigerant can be heated by the source of heat 180 before entering the heat exchanger 102. In an embodiment, the source of heat 180 can be incorporated in the refrigerant source 130, and no standalone source of heat 180 may be present.

In an embodiment, the control unit 162 can be disposed operatively downstream of the temperature sensor 160 and operatively upstream of the source of heat 180 that heats up the lubricant. The control unit 162 being disposed operatively upstream of the source of heat 180 means the control unit 162 can send out signal to control a heating output of a source of heat 180. That is, the source of heat 180 is operatively downstream of the control unit 162. In one operation, when the lubricant temperature is lower than a fourth temperature, the source of heat 180 can be enabled or can be modified (if already enabled) to increase the heating output by the control unit 162. When the determined temperature is higher than a third temperature, the source of heat 180 can be disabled or modified (to decrease the heating output) by the control unit 162.

In summary, as shown in FIG. 1, the optional source of heat 180 (shown in dashed line), can be configured such that lubricant upstream of the heat exchanger 102, lubricant downstream of the heat exchanger 102, and refrigerant upstream to the heat exchanger 102 can be heated by the source of heat 180. The source of heat 180 can be any source that provides sufficient heat to heat up lubricant or refrigerant. Examples suitable for the source of heat 180 include, but are not limited to, a heater, a heat pump, a heat exchanger, or the like.

In an embodiment of a method for regulating lubricant temperature, a first temperature can have a range between about 110° F. and about 170° F. In an embodiment, a first temperature can have a range between about 130° F. and about 150° F. In an embodiment, a first temperature can have a range between about 135° F. and about 145° F.

In an embodiment of a method for regulating lubricant temperature, a second temperature can have a range between about 95° F. and about 155° F. In an embodiment, a second temperature can have a range between about 115° F. and about 135° F. In an embodiment, a second temperature can have a range between about 120° F. and about 130° F.

In an embodiment, a third temperature can have a range between about 110° F. and about 170° F. In an embodiment, a third temperature can have a range between about 130° F. and about 150° F. In an embodiment, a third temperature can have a range between about 135° F. and about 145° F.

In an embodiment, a fourth temperature can have a range between about 95° F. and about 155° F. In an embodiment, a fourth temperature can have a range between about 115° F. and about 135° F. In an embodiment, a fourth temperature can have a range between about 120° F. and about 130° F.

In an embodiment, the first temperature can be the same as the third temperature; the second temperature can be the same as the fourth temperature; and the first and third temperatures can be larger than the second and fourth temperatures. In an embodiment, the first temperature can be the same as the second temperature; the third temperature can be the same as the fourth temperature; and the first and second temperatures can be larger than the third and fourth temperatures. It will be appreciated that these combinations of the first, second, third, and fourth temperatures are examples. The possibilities of different temperature combinations are determined by the temperature ranges described above for the first, second, third, and fourth temperatures.

Figure 2:
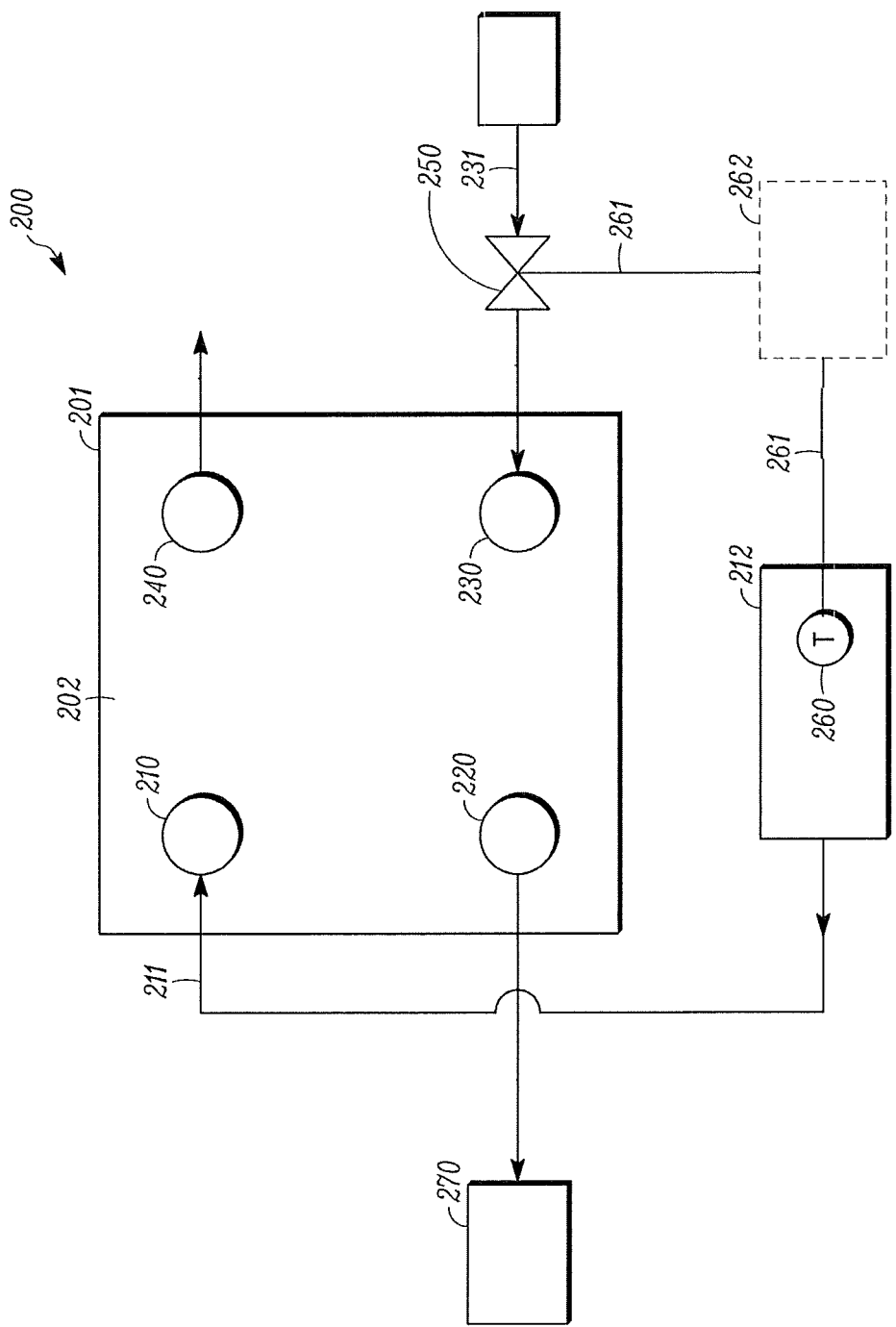
FIG. 2 shows a lubricant temperature regulating system wherein a temperature sensor is located within a lubricant sump, according to an embodiment.

FIG. 2 shows a lubricant temperature regulating system 200, according to an embodiment. Aspects of FIG. 2 can be the same as or similar to aspects of FIG. 1.

The lubricant temperature regulating system 200 includes a lubricant temperature regulator 201. The lubricant temperature regulator 201 includes a heat exchanger 202. The heat exchanger 202 includes a lubricant input 210, a lubricant output 220, a refrigerant input 230, and a refrigerant output 240. In the illustrated embodiment, a lubricant source is lubricant sump 212. A lubricant sensing location where a temperature sensor 260 is located is in the lubricant sump 212.

The lubricant input 210 is configured such that lubricant flows into the heat exchanger 202 from a lubricant sump 212. A lubricant sump 212 is a sump that provides a workable source of lubricant. In an embodiment, the lubricant sump 212 may be a part of a compressor. A lubricant input line 211 fluidly connects the lubricant sump 212 and the lubricant input 210. The lubricant output 220 is configured such that lubricant flows from the heat exchanger 202 to a moving mechanical component 270 such as, but not limited to, a compressor bearing, for lubrication of the moving mechanical component 270.

The refrigerant input 230 is configured such that refrigerant flows into the heat exchanger 202. The refrigerant output 240 is configured such that refrigerant flows from the heat exchanger 202. The heat exchanger 202 can increase or decrease the lubricant temperature via a heat exchange relationship between the lubricant and refrigerant. In an embodiment, the lubricant can have a relatively higher temperature when it flows into the heat exchanger 202 and a relatively lower temperature when it flows from the heat exchanger 202. In another embodiment, the refrigerant has a relatively lower temperature when it flows into the heat exchanger 202 and a relatively higher temperature when it flows from the heat exchanger 202.

A flow control device 250 is disposed upstream of the refrigerant input 230. The flow control device 250 can regulate refrigerant flowing into the heat exchanger 202. A temperature sensor 260 is operatively connected to the flow control device 250 through a signal line 261. The temperature sensor 260 is configured to control the flow control device 250 that regulates the flow of the refrigerant. In the illustrated embodiment, the temperature sensor 260 is disposed within a lubricant sump 212 to sense the temperature of the lubricant. In yet an embodiment, the temperature sensor 260 can be located in the lubricant input line 211 to sense the temperature of the lubricant flowing into the heat exchanger 202. It should be understood that the location of the temperature sensor can change according to different design purposes, for example, a desired lubricant sensing location, desired lubricated mechanical components, and the like.

In an embodiment, a control unit 262 may be disposed operatively downstream of the temperature sensor 260 and operatively upstream of the flow control device 250. In an embodiment, the control unit 262 being disposed operatively downstream of the sensor 260 means the control unit 262 can take the temperature signal of the sensor 260 as an input signal for further signal processing. That is, the sensor 260 is operatively upstream of the control unit. The control unit 262 being disposed operatively upstream of the flow control device 250 means the control unit 262 can send a signal to control the flow control device 250. That is, the flow control device 250 is operatively downstream of the control unit. In an embodiment, the control unit 262 may amplify the voltage or current signal of the temperature sensor 260. In an embodiment, the control unit 262 may also perform logical determinations based on the temperature of the lubricant determined. For example, when the determined temperature is higher than a first temperature, the flow control device 250 can increase the flow of the refrigerant. When the determined temperature is lower than a second temperature, the flow control device 250 can disable or reduce the flow of the refrigerant.

In an embodiment, a first temperature can have a range between about 110° F. and about 170° F. In an embodiment, a first temperature can have a range between about 130° F. and about 150° F. In an embodiment, a first temperature can have a range between about 135° F. and about 145° F.

In an embodiment, a second temperature can have a range between about 95° F. and about 155° F. In an embodiment, a second temperature can have a range between about 115° F. and about 135° F. In an embodiment, a second temperature can have a range between about 120° F. and about 130° F.

In an embodiment, a first temperature can be the same as a second temperature and can range between about 95° F. and about 170° F.

The heat exchangers 102, 202 can be any type of heat exchanger. Examples of suitable heat exchangers for the heat exchangers 102, 202 include, but are not limited to, a double pipe heat exchanger, a plate heat exchanger, or the like. Preferably, the heat exchanger 102, 202 can be relatively smaller in size, can have a relatively higher heat exchange efficiency, and can be capable of conducting relatively larger fluid flow. In an embodiment, the heat exchanger is a brazed plate heat exchanger.

The flow control devices 150, 250 can be any type of flow control devices that are controlled electronically/electromagnetically/mechanically. It is to be understood that the control signal is not necessarily conducted by a physical wire. Wireless communication can also be used to control the flow control device. In an embodiment, the flow control device 150, 250 can be a solenoid valve.

Figure 3:
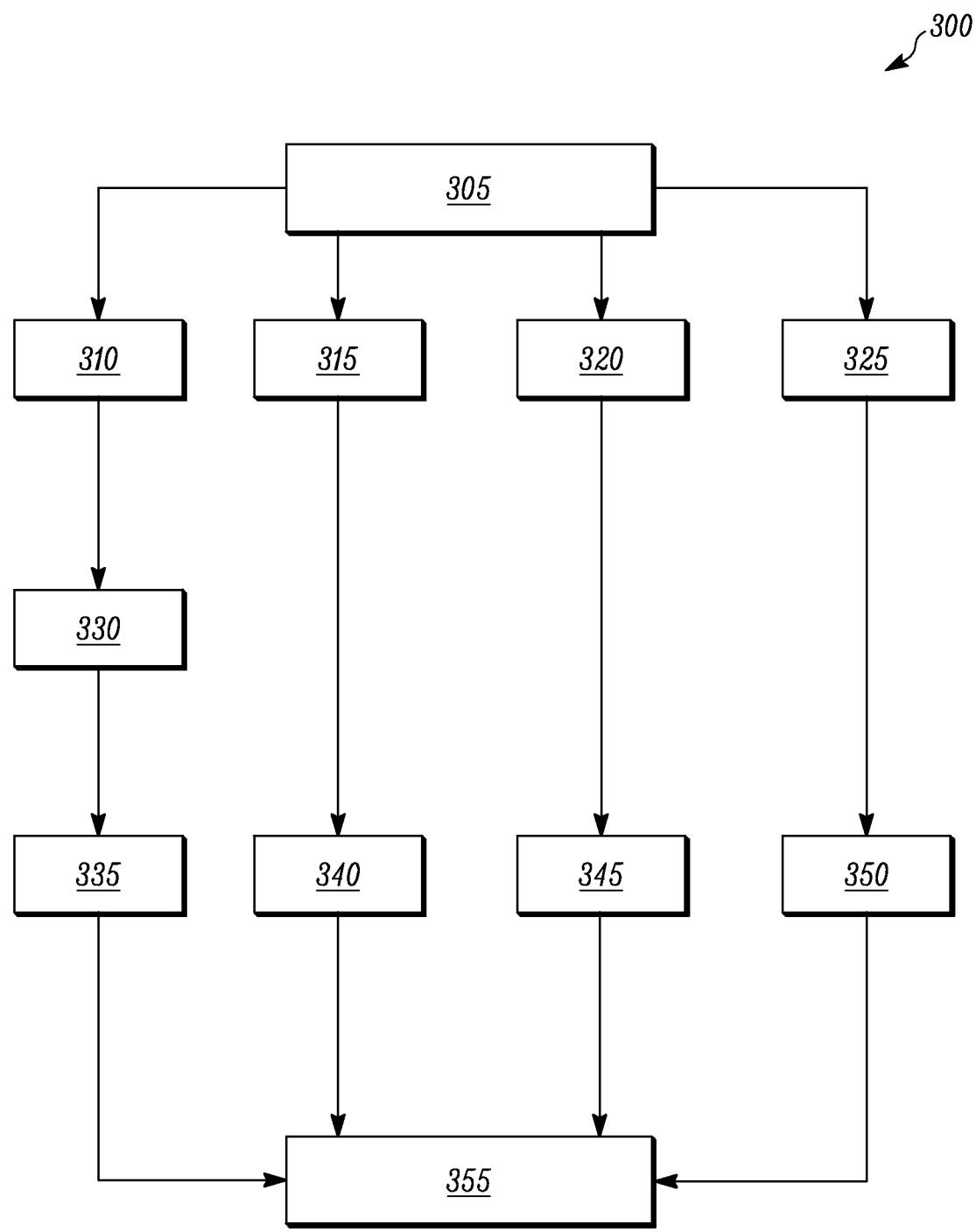
FIG. 3 shows a method for regulating lubricant temperature, according to an embodiment.

FIG. 3 shows a method for regulating lubricant temperature 300 comprises determining a temperature of a lubricant 305. When the temperature of the lubricant determined is higher than a first temperature 310, opening a flow control device disposed upstream of the heat exchanger to increase the flow of the refrigerant into the heat exchanger 330, and directing the lubricant into a heat exchanger 335. Directing the lubricant into a heat exchanger 335 may include directing the lubricant from a lubricant source to the heat exchanger, the lubricant source being configured as a temporary storage of the lubricant. When the temperature of the lubricant determined is lower than a second temperature 315, closing the flow control device disposed upstream of the heat exchanger to decrease the flow of the refrigerant into the heat exchanger 340. In another embodiment, the method further includes, when the temperature is higher than a third temperature 320, a heating output provided by a source of source of heat for heating up the lubricant is reduced or turned off 345. When the temperature is lower than a fourth temperature 325, a heating output provided by a source of heat for heating up the lubricant is increased or turned on 350. In another embodiment, the method further includes directing the lubricant from the heat exchanger to moving mechanical components, e.g., compressor bearings, disposed downstream of the heat exchanger 345. In another embodiment, the method further includes directing the lubricant from the heat exchanger to a moving mechanical component disposed downstream of the heat exchanger 355.

Aspects:

It is noted that any one of aspects 1-8 can be combined with any one of aspects 9-20. Any one of aspects 9-14 can be combined with any one of aspects 15-20.

Aspect 1. A lubricant temperature regulator, comprising:
 a heat exchanger, the heat exchanger including:
  a lubricant input configured such that lubricant flows into the heat exchanger;
  a lubricant output configured such that lubricant flows out from the heat exchanger;
  a refrigerant input configured such that refrigerant flows into the heat exchanger;
  a refrigerant output configured such that refrigerant flows out from the heat exchanger;
 a flow control device disposed upstream of the refrigerant input; and
 a temperature sensor operatively connected to the flow control device,
  wherein the temperature sensor is disposed at a location to determine a temperature of lubricant that flows into the heat exchanger through the lubricant input;
  when the temperature is higher than a first temperature, the flow control device is configured to increase the flow of refrigerant;

when the temperature is lower than a second temperature, the flow control device is configured to decrease the flow of refrigerant.

Aspect 2. The lubricant temperature regulator according to aspect 1, wherein the temperature sensor is disposed at a location to sense a temperature of lubricant that flows into the heat exchanger.

Aspect 3. The lubricant temperature regulator according to any one of aspects 1-2, wherein the temperature sensor is disposed at a location to sense a temperature of lubricant that flows out from the heat exchanger.

Aspect 4. The lubricant temperature regulator according to any one of aspects 1-3, wherein the heat exchanger can be a brazed plate heat exchanger.

Aspect 5. The lubricant temperature regulator according to any one of aspects 1-4, further includes:
a control unit disposed operatively downstream of the temperature sensor and operatively upstream of the flow control device, the control unit controls the flow control device according to the temperature of lubricant determined by the temperature sensor.

Aspect 6. The lubricant temperature regulator according to any one of aspects 1-5, wherein the flow control device is a solenoid valve.

Aspect 7. The lubricant temperature regulator according to any one of aspects 1-6, wherein the first temperature is any temperature between 110 and 170° F., the second temperature is any temperature between 95 and 155° F.

Aspect 8. The lubricant temperature regulator according to any one of aspects 1-7, wherein the first temperature is a same temperature as the second temperature.

Aspect 9. A lubricant temperature regulating system, comprising:
a lubricant temperature regulator, including,
a heat exchanger, the heat exchanger including,
a lubricant input, through which lubricant flows into the heat exchanger;
a lubricant output, through which lubricant flows out from the heat exchanger;
a refrigerant input, through which refrigerant flows into the heat exchanger;
a refrigerant output, through which refrigerant flows out from the heat exchanger;
a lubricant source fluidically connected to and disposed upstream of the lubricant input;
a refrigerant source fluidically connected to and disposed upstream of the refrigerant input;
a flow control device disposed upstream of the refrigerant input and downstream of the refrigerant source; and
a temperature sensor operatively connected to the flow control device, the temperature sensor being configured to control an opening of the flow control device, wherein the temperature sensor is configured to determine a temperature of lubricant that flows into the heat exchanger through the lubricant input;
when the temperature is higher than a first temperature, the flow control device is controlled to increase the opening of the flow control device to increase a flow of refrigerant;
when the temperature is lower than the first temperature, the flow control device is controlled to reduce the opening of the flow control device to decrease the flow of refrigerant.

Aspect 10. The lubricant temperature regulating system according to aspect 9, wherein the refrigerant source is a location in a condenser or a location downstream of a condenser in a HVAC system.

Aspect 11. The lubricant temperature regulating system according to any one of aspects 9-10, further includes,
a moving mechanical component disposed downstream of the heat exchanger, the lubricant output being configured to have fluidic access to the moving mechanical component, the moving mechanical component being configured to be lubricated by the lubricant that flows out from the lubricant output.

Aspect 12. The lubricant temperature regulating system according to any one of aspects 9-11, wherein the temperature sensor is operatively connected to a source of heat that heats up the lubricant, the temperature sensor being configured to regulate a heating output of a source of heat;
when the temperature is higher than a third temperature, the heating output is turned off or decreased; and
when the temperature is lower than a second temperature, the heating output is turned on or increased.

Aspect 13. The lubricant temperature regulating system according to any one of aspects 9-12, further includes,
a control unit disposed operatively downstream of the temperature sensor and operatively upstream of the flow control device, the control unit controls the flow control device according to the temperature of lubricant determined by the temperature sensor.

Aspect 14. The lubricant temperature regulating system according to any one of aspects 9-13, wherein,
the first temperature is any temperature from at or about 110° F. to at or about 170° F.,
the second temperature is any temperature from at or about 95° F. to at or about 155° F.,
the third temperature is any temperature from at or about 110° F. to at or about 170° F., and
the fourth temperature is any temperature from at or about 95° F. to at or about 155° F.

Aspect 15. A method for regulating lubricant temperature, comprising:
determining a temperature of a lubricant;
when the temperature of the lubricant determined is higher than a first temperature;
opening a flow control device disposed upstream of the heat exchanger to increase the flow of the refrigerant into the heat exchanger; and
directing the lubricant into a heat exchanger; and
when the temperature of the lubricant determined is lower than a second temperature;
closing the flow control device disposed upstream of the heat exchanger to decrease the flow of the refrigerant into the heat exchanger.

Aspect 16. The method for regulating lubricant temperature according to aspect 15, further includes,
when the temperature of the lubricant determined is lower than a fourth temperature, increasing an amount of heat from a source of heat that heats up the lubricant or refrigerant; and
when the temperature of the lubricant determined is higher than a third temperature, decreasing an amount of heat from the source of heat that heats up the lubricant or refrigerant.

Aspect 17. The method for regulating lubricant temperature according to any one of aspects 15-16, further includes,
directing the lubricant from the heat exchanger to a moving mechanical component disposed downstream of the heat exchanger.

Aspect 18. The method for regulating lubricant temperature according to any one of aspects 15-17, wherein directing a lubricant into a heat exchanger further includes, directing the lubricant from a lubricant source to the heat exchanger, the lubricant source being configured as a temporary storage of the lubricant.

Aspect 19. The method for regulating lubricant temperature according to any one of aspects 15-18, further includes, the first temperature being a temperature from at or about 110° F. to at or about 170° F.

the second temperature being a temperature from at or about 95° F. to at or about 155° F.

Aspect 20. The method for regulating lubricant temperature according to any one of aspects 15-19, further includes, the third temperature being a temperature from at or about 110° F. to at or about 170° F.

the fourth temperature being a temperature from at or about 95° F. to at or about 155° F.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A heating, ventilation, and air conditioning (HVAC) system, comprising:
    a centrifugal compressor;
    a lubricant sump of the centrifugal compressor in the HVAC system;
    a condenser;
    a refrigerant source, the refrigerant source being the condenser such that refrigerant is provided directly from the condenser;
    a lubricant temperature regulator, including,
        a heat exchanger, the heat exchanger including,
            a lubricant input in fluid communication with the lubricant sump of the centrifugal compressor through which lubricant is received from the lubricant sump and flows into the heat exchanger via a lubricant input line;
            a lubricant output in fluid communication with a mechanical component via a lubricant output line through which lubricant flows from the heat exchanger via the lubricant output line to the mechanical component;
            a refrigerant input through which refrigerant flows into the heat exchanger from the refrigerant source, the refrigerant source being upstream of the refrigerant input;
            a refrigerant output through which refrigerant flows from the heat exchanger, wherein the refrigerant flow and the lubricant flow are in a heat exchange relationship in the heat exchanger;
        a flow control device disposed upstream of the refrigerant input and downstream of the refrigerant source; and
        a temperature sensor operatively connected to the flow control device, the temperature sensor to control an opening of the flow control device, wherein the temperature sensor determines a temperature of lubricant;
        when the temperature of the lubricant is higher than a first temperature, the flow control device is controlled to increase the opening of the flow control device to increase a flow of refrigerant into the heat exchanger;
        when the temperature of the lubricant is lower than the first temperature, the flow control device is controlled to reduce the opening of the flow control device to decrease the flow of refrigerant into the heat exchanger.

2. The HVAC system according to claim 1, wherein the mechanical component is disposed downstream of the heat exchanger, the lubricant output being in fluid communication with the mechanical component, the mechanical component being lubricated by the lubricant that flows from the lubricant output via the lubricant output line.

3. The HVAC system according to claim 1, wherein the temperature sensor is operatively connected to a source of heat that heats the lubricant, the temperature sensor to regulate a heating output of the source of heat;
    when the temperature is higher than a third temperature, the heating output is disabled or decreased; and
    when the temperature is lower than a second temperature, the heating output is enabled or increased.

4. The HVAC system according to claim 3, wherein,
    the first temperature ranges from at or about 110° F. to at or about 170° F.,
    the second temperature ranges from at or about 95° F. to at or about 155° F.,
    the third temperature ranges from at or about 110° F. to at or about 170° F., and
    the fourth temperature ranges from at or about 95° F. to at or about 155° F.

5. The HVAC system according to claim 1, further comprising:
    a control unit disposed operatively downstream of the temperature sensor and operatively upstream of the flow control device, wherein the control unit controls the flow control device according to the temperature of the lubricant determined by the temperature sensor.

6. The HVAC system according to claim 1, wherein the mechanical component is a bearing of the centrifugal compressor.

7. The HVAC system according to claim 1, wherein the heat exchanger is a brazed plate heat exchanger.

* * * * *